(12) United States Patent
Hille et al.

(10) Patent No.: US 9,250,090 B2
(45) Date of Patent: Feb. 2, 2016

(54) NAVIGATION SYSTEM AND CONTROL UNIT FOR NAVIGATION SYSTEM

(75) Inventors: Jan Hille, Siegen (DE); Klaus Olberg, Ople (DE); Reinhard Kromer-Von Baerle, Bad Homburg (DE); Lutz P. Richter, Mixdorf (DE)

(73) Assignee: Peiker Acustic GmbH & Co., Friedrichsdorf (DE)

( * ) Notice: Subject to any disclaimer, the term of this patent is extended or adjusted under 35 U.S.C. 154(b) by 1468 days.

(21) Appl. No.: 12/606,402

(22) Filed: Oct. 27, 2009

(65) Prior Publication Data

US 2010/0106406 A1    Apr. 29, 2010

Related U.S. Application Data

(63) Continuation of application No. PCT/DE2008/000736, filed on Apr. 30, 2008.

(30) Foreign Application Priority Data

Apr. 30, 2007  (DE) .......................... 10 2007 020 622
May 25, 2007  (DE) .......................... 10 2007 024 713

(51) Int. Cl.
*G01C 21/26*     (2006.01)
*G01C 21/34*     (2006.01)

(52) U.S. Cl.
CPC ..................................... *G01C 21/34* (2013.01)

(58) Field of Classification Search
USPC ......... 701/208, 215, 213, 200, 300, 207, 210, 701/408, 409, 431, 117, 484, 450, 491, 701/533; 340/988, 539.1, 539.13, 825.49, 340/990, 539.11, 539.2, 539.32, 995.13, 340/995.17; 342/457, 357.08, 357.13, 342/357.07, 357.09, 357.31; 455/414.2, 455/556.1, 569.2, 575.9
See application file for complete search history.

(56) References Cited

U.S. PATENT DOCUMENTS 6,992,583 B2 * 1/2006 Muramatsu ........ G01C 21/3688
                                                           340/539.11
2002/0044070 A1   4/2002 Duckeck
2003/0114980 A1 * 6/2003 Klausner et al. ........ G01C 21/26
                                                           701/32.7
2003/0228879 A1  12/2003 Witkowski et al.

FOREIGN PATENT DOCUMENTS

DE       100 32 921 A1    1/2002
DE       10 2004 036 5    3/2006
EP        1 055 911 A1    11/2000
WO       2004/113842 A1   12/2004

* cited by examiner

*Primary Examiner* — Adam Tissot
(74) *Attorney, Agent, or Firm* — Burr & Brown, PLLC

(57) ABSTRACT

A navigation system for a vehicle including a mobile navigation computer, a vehicle-based central control unit, a GPS receiver, a communication link between the mobile navigation computer and the central control unit, wherein position data for the vehicle is processed in a navigation unit in the mobile navigation computer to form information relevant to the navigation. The navigation information is transmitted from the navigation computer to the control unit for a respective maneuver which is to be performed, and this information is output in at least one of visual and audible forms via the central control unit. The position data for the vehicle is determined by the position-finding unit of the central control unit, and is transmitted to the mobile navigation computer, wherein the vehicle is navigated on the basis of data calculated in the navigation unit of the mobile navigation computer.

18 Claims, 5 Drawing Sheets

NAVIGATION SYSTEM AND CONTROL UNIT FOR NAVIGATION SYSTEM

CROSS REFERENCE TO RELATED APPLICATIONS

This application is a continuation of International Application No. PCT/DE2008/000736, filed Apr. 30, 2008, which designated the United States, and claims the benefit under 35 USC §119(a)-(d) of German Application Nos. 10 2007 020 622.6 filed Apr. 30, 2007 and 10 2007 024 713.5 filed May 25, 2007, the entireties of which are incorporated herein by reference.

FIELD OF THE INVENTION

The invention relates to a navigation system and a control unit for forming a navigation system for a vehicle.

BACKGROUND OF THE INVENTION

WO 2004/113842 A1 discloses a navigation system in which a mobile reception unit, such as a mobile telephone or a PDA, receives position data and forwards the position data to a central control unit arranged in the vehicle, wherein the navigation is performed on the basis of the position data from the mobile reception unit in the central control unit. A drawback of such a two-part navigation system is the high level of technical complexity for the central control unit, which makes the unit expensive, since, apart from the GPS receiver, it comprises all the components which are required for the navigation.

SUMMARY OF THE INVENTION

The invention is based on the object of developing a navigation system which is formed by a central control unit and a mobile appliance, wherein the central control unit is intended to be of as simple design as possible. In addition, the two appliances need to be optimized in terms of the volume of data to be transmitted between the appliances. Finally, it is an object of the invention to use the navigation system formed by the two electronic appliances to achieve the performance of what is known as a permanently installed navigation system.

The inventive navigation system for a vehicle comprises a mobile navigation computer, a vehicle-based central control unit, a GPS receiver, a communication link between the mobile navigation computer and the central control unit, wherein position data for the vehicle can be processed in a navigation unit in the mobile navigation computer to form information (DM1) relevant to the navigation, wherein in the course of the navigation the relevant information (DM1) can be transmitted from the navigation computer to the control unit for a respective maneuver which is to be performed, and wherein this information can be output visually and/or audibly via the central control unit. An advantage of such a two-part navigation system is that the mobile navigation computer, which can also be used separately and autonomously for navigation in the vehicle, is integrated into the vehicle such that the mobile navigation computer and the control unit produce a navigation system in which the components of the mobile navigation computer and the central control unit form a hybrid navigation system. This hybrid navigation system uses components from both appliances and is thus optimized in terms of the requirements on performance and/or power consumption of the navigation system. The hybrid navigation system can be optimally matched to the requirements for vehicle-based navigation without one of the two appliances needing to provide all of the components for this. The essence of the invention is therefore a hybrid navigation system in which each appliance preferably performs the tasks for which it is better suited, the mobile navigation computer being provided particularly for the purpose of using its navigation unit in the course of the navigation to determine relevant information and to transmit the information to the central control unit for a respective maneuver which is to be performed. The central control unit is provided particularly for the purpose of outputting this relevant information visually and/or audibly. In respect of the further components, the invention provides for the component which is respectively more suitable on the basis of the requirements to be incorporated into the hybrid navigation system or for the component to be reserved as a redundant component of the hybrid navigation system. An advantage of such a two-part navigation system is therefore that it is possible to dispense with a navigation unit in the vehicle-based central control unit, and this means that the technical and/or financial involvement for the central control unit is accordingly lower. Hence, an already available mobile appliance whose processor with an appropriate piece of software can be used as a navigation computer results in a corresponding saving on the purchase of a vehicle-specific navigation system. The essence of the invention is therefore a two-part navigation system which works efficiently on the basis of a split in the tasks required for the navigation, such as position-data determination, route and maneuver calculation and output of driving instructions. This involves the output of driving instructions being moved to the vehicle-based central control unit, and the route and the maneuver calculation being performed by the mobile navigation computer.

In a first variant embodiment of the invention, the position data for the vehicle can be determined by a position-finding unit in the mobile navigation computer, particularly using the GPS receiver associated with the navigation computer and/or at least one sensor associated with the navigation computer, and can be processed in the navigation unit of the mobile navigation computer to form the data which are relevant to the navigation. This makes it possible to dispense with a GPS receiver and a position-finding unit completely in the vehicle-based central control unit. As a result, the vehicle-based central control unit can be produced particularly inexpensively. An "associated GPS receiver" refers to a GPS receiver which is arranged in the mobile navigation computer itself or is wirelessly connected or wired thereto.

In a second variant embodiment of the invention, the position data for the vehicle can be determined by the position-finding unit of the central control unit, particularly using the GPS receiver associated with the central control unit and/or at least one sensor associated with the central control unit, and can be transmitted to the mobile navigation computer, wherein the vehicle can be navigated on the basis of the relevant data calculated for the navigation from the transmitted position data in the navigation unit of the mobile navigation computer. Such distribution of tasks in the hybrid navigation system forms a particularly power-saving variant embodiment for the mobile navigation computer, the advantage of such a variant embodiment being manifested particularly in a GPS receiver incorporated by means of a radio link. An "associated GPS receiver" refers to a GPS receiver which is arranged in the central control unit itself or is wirelessly connected or wired thereto.

A third variant embodiment corresponds to the first variant embodiment, with provision being additionally made for the mobile navigation computer to be provided with data from a sensor associated with the central control unit and, as a result, for the accuracy of the data which are output by the position-finding unit to be increased particularly for tunnel drives and/or multistory car park drives.

A fourth variant embodiment corresponds to the second variant embodiment, with provision additionally being made for the central control unit to be provided with data from a sensor associated with the mobile navigation computer and as a result for the accuracy of the data which are output by the position-finding unit to be increased particularly for tunnel drives and/or multistory car park drives.

In one embodiment of the invention, the GPS receiver for vehicle-based navigation can be arranged in the central control unit. This keeps down the power consumption in the mobile navigation computer.

In a further variant embodiment of the invention, the GPS receiver for the vehicle-based navigation can be arranged as part of the vehicle independently of the navigation computer and the central control unit. This makes it possible to choose a position with optimum reception for the GPS receiver independently of the arrangement of the navigation computer and the control unit, and the GPS receiver can be used directly by the navigation computer and/or the central control unit.

In addition, the invention provides a wireless communication link between the GPS receiver associated with the vehicle and the central control unit or the navigation unit for the navigation. This makes the installation particularly simple, since no cables need to be laid to the GPS receiver.

The invention also provides for the navigation computer to be able to be used to perform navigation outside the vehicle too. This means that a navigation system is also available outside the vehicle.

In line with the invention, the navigation computer is in the form of a mobile telephone or a mobile navigation system or a laptop or a PDA or a holder shell for a mobile telephone. The usability of such different appliances as a navigation computer makes the simple design of the control unit appealing to a large target group.

In addition, the invention provides for the mobile navigation computer to be supplied by a service center with data for routing. This allows rapid route calculation to be performed regardless of the computation power of the navigation computer.

The invention also provides for the mobile navigation computer to be supplied by a service center with data for map presentation. This allows the currentness of the stock of data to be assured without this requiring the user to load an update.

In line with the invention, the position data for the vehicle can be calculated by the position-finding unit of the central control unit using data from the GPS receiver and/or data from a rotation angle sensor and/or speed pulses from a speed pulse transmitter. The use of additional data from the rotation angle sensor and/or from the speed pulse transmitter allows the current position of the vehicle to be determined precisely even in a tunnel, in an underpass, in an underground garage or in other areas shielded from satellite signals. The use of such additional information means that the two-part navigation system according to the invention achieves a level of accuracy for the determination of the current position which is comparable with that of high-quality, permanently installed navigation systems.

In addition, the invention provides for the position data or else just complementary vehicle-typical data for the position calculation, such as speed pulse or steering angle, from the central control unit for the mobile navigation computer and the relevant information from the mobile navigation computer for the central control unit to be transmitted via the same communication link. This allows the technical complexity for the data transmission to be kept down.

In one variant embodiment of the invention, the position data from the central control unit for the mobile navigation computer and the relevant information from the mobile navigation computer for the central control unit can be transmitted via different communication links. This allows all the data to be transmitted without delay.

In addition, the invention provides for the relevant information to be output via the central control unit at times which can be determined by the central control unit. In this manner, the output of the relevant information, such as the output of maneuvering points, is performed independently on the basis of the position data ascertained by the central control unit and independently of the mobile navigation computer. This effectively avoids further data traffic between the central control unit and the mobile navigation computer.

In particular, provision is made for the relevant information to be output via the central control unit when waypoints which can be determined by the central control unit are reached. Hence, the central control unit is independent of the mobile navigation computer when a maneuver is performed.

The invention also provides for the relevant information to be output via the central control unit graphically on a display and/or audibly on at least one loudspeaker. This allows the user to be comprehensively informed.

The invention also provides for encoded and/or compressed relevant information from the navigation computer to be decoded and/or decompressed in the central control unit. When such information is transmitted, it is possible to dispense with an audio channel and the volume of data is small. This allows particularly the power consumption of the mobile navigation computer to be lowered, so that said computer can be operated without hesitation exclusively by means of batteries or storage batteries.

The invention provides for the relevant information from the navigation computer, having been decoded and/or decompressed by the central control unit, to be combined to form at least one command on the basis of time and/or position. Such commands can be produced with low computation power and hence also in power-saving fashion.

In addition, the invention provides for the navigation destination for the routing to be input on the central control unit, where the navigation destination can be transmitted to the mobile navigation computer and wherein the necessary route calculation can be performed by the mobile navigation computer. In particular, provision is made for the navigation destination to be captured by means of the display of the central control unit and/or by means of a microphone using voice commands and/or by means of at least one control element. This allows convenient input, which is performed independently of the navigation computer.

The invention also provides for a telephone book stored in the navigation computer to be transmitted to the central control unit, the telephone book being taken as a basis for selecting a navigation destination using the central control unit, with the navigation destination being able to be completed using an address book which is present in the navigation computer. The access to the personal entries in the navigation computer allows simple destination input, since there is usually already an entry in the telephone book and address book for almost every destination.

In one variant embodiment, an address book stored in the navigation computer can be transmitted to the central control unit, and this can be taken as a basis for selecting a navigation destination using the central control unit. This achieves even shorter reaction times, since all the address data are already available in the central control unit.

In particular, the invention also provides for a service center to be automatically checked by the navigation computer when the navigation destination has been input. This means that it is not possible for the user to ascertain any difference between a route calculation performed on the navigation computer and a route calculation performed by the service center.

The invention also provides for the navigation system to be used as a hands-free device for the mobile telephone when a mobile telephone is used as the navigation computer. When the navigation system is in such a form, it is possible for a display, a microphone and a loudspeaker to be used both for the operation of the navigation system and for the telephone and/or hands-free functions of the mobile telephone being used as a navigation computer.

In addition, the invention provides for data from at least one sensor arranged in the vehicle, such as particularly a rotation angle sensor or speed pulse transmitter, to be processed in the position-finding unit of the control unit to form ground-based position data and/or for data from the GPS receiver associated with the central control unit to be processed to form satellite-based position data and for the coordinates ascertained therefrom to be transmitted to the navigation unit of the navigation computer via the transmission and reception unit. The invention provides for the control unit to be able to receive detailed map information pertaining to a corridor which is to be traversed together with information which is relevant to the routing, and for this detailed information to be able to be used in the control unit for presenting a map and for outputting relevant information at defined waypoints, with the presentation and output being effected on the basis of position calculations performed by the control unit. As a result, it is possible for the map information and the information which is relevant to the routing, such as turning instructions, lane-change instructions etc., to be transmitted independently of the actual time at which they are required. It is thus possible to effectively prevent delayed presentation and/or output.

The control unit according to the invention for forming a navigation system for a vehicle provides for the determination of position data for the vehicle, wherein the position data can be transmitted from the control unit to a navigation computer, wherein the control unit can receive and store relevant information for at least one maneuver, and wherein the relevant information can be output by the control unit at defined waypoints on the basis of a position calculation performed by the control unit or a position calculation performed by a mobile navigation computer. A control unit of this kind provides the user with full-scale navigation by means of communication with a mobile appliance that is situated in the vehicle and that is in the form of a navigation computer, without needing to have all the necessary components itself.

Within the context of the invention, relevant information from the navigation computer is intended to be understood to mean details of maneuvers, such as direction changes and lane changes, and information connected to the maneuvers, such as distance details and road names, but also information regarding the maximum speed on the current road, roadworks information and traffic information which is relevant to the driver. The term relevant information is alternatively intended to be understood within the context of the invention to mean information which is relevant to passengers, such as information relating to the country.

A transmission path within the context of the invention is a wireless or wired communication link, with a wireless communication link respectively using a radio standard. By way of example, the radio standard is the Bluetooth standard or the WiFi standard based on IEEE 802.11 or similar transmission methods which are suitable for data transmission at close range.

A telephone book within the context of the invention is to be understood to mean a file which contains, in an electronic table, an association between communication addresses, such as telephone numbers or email addresses, and names. An address book within the context of the invention is intended to be understood to mean a file which contains, in an electronic table, an association between geographical data, for example in the form of coordinates or country names, city names, road names and house numbers, and names. An address book may also include communication addresses. A telephone book may therefore be a subset of an address book.

Vehicle-based navigation within the context of the invention is intended to be understood to mean navigation which is performed in a vehicle, with a central control unit and a mobile navigation computer working together. Mobile navigation within the context of the invention is intended to be understood to mean navigation which is performed outside a vehicle and can be performed solely using the mobile navigation computer. In addition, onboard navigation is understood to mean navigation in which the route calculation is performed in the navigation appliance, e.g. in the mobile navigation computer itself. In contrast to this, offboard navigation is understood to mean navigation in which the route calculation is performed on a server, which then transmits the calculated data wirelessly to the navigation appliance, e.g. the mobile navigation computer.

Components of the mobile navigation computer or of the central control unit refer to the electronic components thereof, such as transmission and reception unit, position-finding unit, navigation module etc.

BRIEF DESCRIPTION OF THE DRAWINGS

Further details of the invention are described in the drawing with reference to schematically illustrated exemplary embodiments.

DETAILED DESCRIPTION OF THE INVENTION

Figure 1:
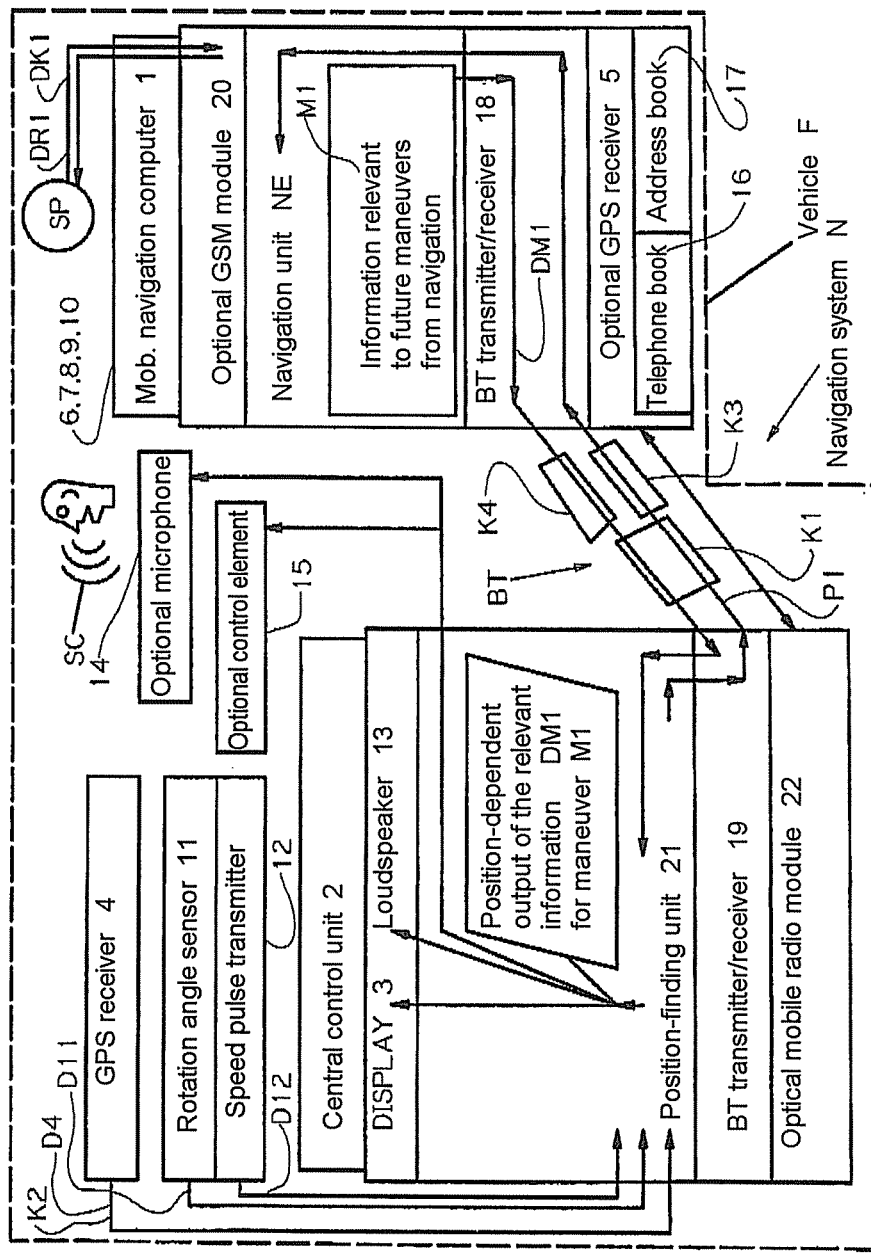
FIG. 1 shows a schematic illustration of a navigation system according to the invention in a vehicle.

FIG. 1 schematically shows a navigation system N according to the invention. The navigation system N is provided for a vehicle F and comprises a mobile navigation computer 1, a vehicle-based central control unit 2, a GPS receiver 4 and a communication link K1 between the mobile navigation computer 1 and the central control unit 2. The navigation system N can be used to capture position data P1 for the vehicle F by means of the central control unit 2 and transmit them to the mobile navigation computer 1. The transmitted position data P1 can be taken as a basis for navigating the vehicle F using the navigation computer 1. In the course of the navigation, relevant information DM1 regarding a respective maneuver M1 to be performed (see also FIG. 2) can be transmitted from the navigation computer 1 to the control unit 2. This information DM1 can be output visually and/or audibly for a user of the vehicle F by means of the central control unit 2. In line with the invention, the mobile navigation computer 1 is in the form of a mobile telephone 6, in the form of a mobile and/or portable navigation system 7, in the form of a laptop 8, in the form of a personal digital assistant 9 or in the form of a holder shell 10 for a mobile telephone, for example. The navigation computer 1 comprises at least one navigation unit NE and a transmission and reception unit 18 which the navigation computer 1 can use to communicate with the central control unit 2, the control unit 2 likewise having a transmission and reception unit 19. By way of example, the navigation computer 1 optionally also comprises components such as an internal GPS receiver 5, a GSM module 20, a telephone book 16 and/or an address book 17. The internal GPS receiver 5 is provided for what is known as mobile navigation, in which the mobile navigation computer 1 forms a standalone navigation system outside the vehicle F. Provided that the navigation computer 1 is incorporated in the navigation system N according to the invention, the navigation unit NE of the navigation computer 1 uses position data P1 to navigate on the basis of map material stored permanently and/or temporarily in the navigation computer 1. The position data P1 can be determined in the central control unit 2 and transmitted to the mobile navigation computer 1. For the purpose of determining the position data P1, the central control unit 2 comprises a position-finding unit 21, which processes data from a GPS receiver 4 and/or from a rotation angle sensor 11 and/or from a speed pulse transmitter 12. Coordinates thus obtained by the position-finding unit 21 are transmitted to the navigation unit NE of the navigation computer 1 via the transmission and reception unit 19. The central control unit 2 comprises a display 3 and a loudspeaker 13 for the visual and audible output of information relating to the navigation route and particularly for the position-dependent output of the relevant information DM1 for the maneuver M1 which is to be performed, for example turning at a junction. The display 3 may also be formed by a display which can be used for other purposes in the vehicle. Similarly, the loudspeaker 13 may be a loudspeaker which can be used for other purposes in the vehicle F. Optionally, provision is made for the central control unit 2 to be equipped with a mobile radio module 22 and/or a hands-free device 23. For accepting voice commands SC and/or for implementing a hands-free function, a microphone 14 is provided for the central control unit 2. The GPS receiver 4, which uses a second communication link K2 to transmit data D4 to the position-finding unit 21, is arranged in the vehicle F at a point which allows optimum reception of satellite signals. If the GPS receiver 4 arranged in the vehicle F fails, it is also possible for the position-finding unit 21 to use the GPS receiver 5 which may be present in the mobile navigation computer 1. As a variant embodiment, FIG. 1 shows two different communication links K3 and K4 as an alternative to the communication link K1. In this context, the communication link K3 is responsible for transmitting the position data P1 from the position-finding unit 21 to the navigation unit NE. The communication link K4 is used to transmit the relevant information DM1 from the navigation unit NE to the position-finding unit 21. The latter then takes the current position as a basis for ensuring output of the relevant information on the display 3 and/or via the loudspeaker 13. In line with one variant embodiment, provision is also made for data for map presentation DK1 and/or data for routing DR1 to be loaded from a service center via a mobile radio link. This means that, in comparison with a solution in which the routing takes place on the navigation computer, the mobile navigation computer 1 requires a lower computation power and a smaller memory. A navigation destination A1 can be input on the central control unit 2 via the microphone 14 and/or the display 3 in the form of a touchscreen and/or a control element 15, for example in the form of a multifunction rotary knob.

Figure 2:
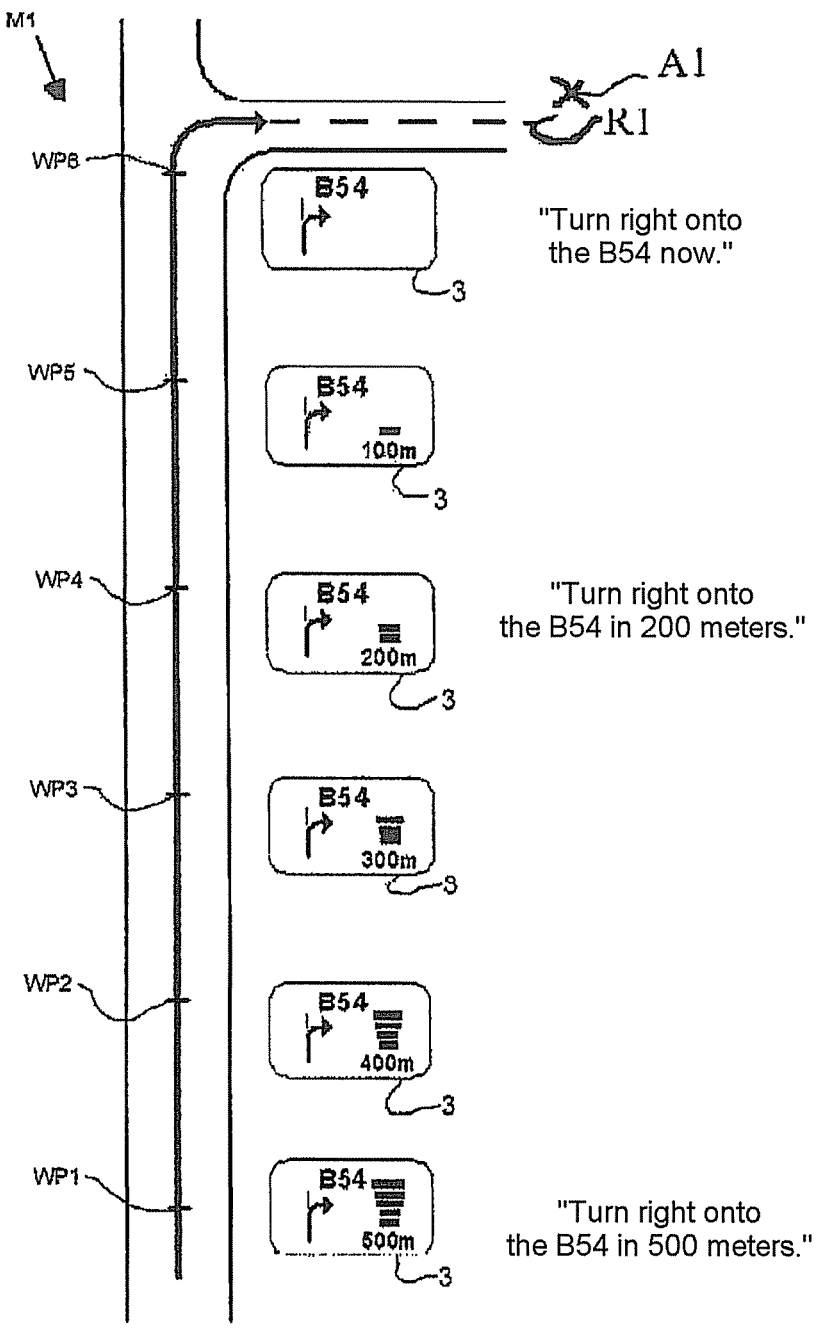
FIG. 2 shows a schematic illustration of contents of the display of the central control unit at different waypoints during the maneuver M1.

FIG. 2 shows a schematic illustration of contents of the display 3 of the central control unit 2 at different waypoints WP1 to WP6 during the maneuver M1. Before reaching the waypoint WP1, which is situated on the route calculated by the navigation unit NE, the navigation unit NE transmits the relevant information DM1 regarding the maneuver M1 to the position-finding unit 21 of the central control unit 2 via the communication link K1. As soon as the position-finding unit 21 establishes that the waypoint WP1 has been reached, the display 3 is used to indicate that it is necessary to turn right onto the B54 in 500 m. At the same time, the loudspeaker 13 (see FIG. 1) is used to make a voice announcement "Turn right onto the B54 in 500 meters". The display content is respectively updated at the subsequent waypoints WP2 to WP6, with a voice announcement respectively being made again at the waypoints WP4 and WP6. In terms of the output of the individual display contents and in terms of the voice announcements, the maneuver M1 therefore takes place independently of the navigation computer 1. Only information DM1, associated with coordinates and/or waypoints, which is generated by the navigation computer 1 in advance of the maneuver M1 is transferred to the central control unit 2 and output by the latter on the basis of the coordinates and/or waypoints WP1 to WP6 being reached. If the vehicle does not reach a waypoint at which a piece of information is intended to be output, for example because it has turned off beforehand, the information associated with this waypoint is also not output by the central control unit 2. By way of example, a voice generator can be used for outputting the voice announcements. It is therefore not necessary for the navigation computer 1 to generate or transmit comparatively large audio files. The maneuver M1 is part of routing R1 to a navigation destination A1. To simplify the input of the navigation destination A1, provision is made for the telephone book 16 and/or the address book 17 to be used by the control unit.

Figure 3:
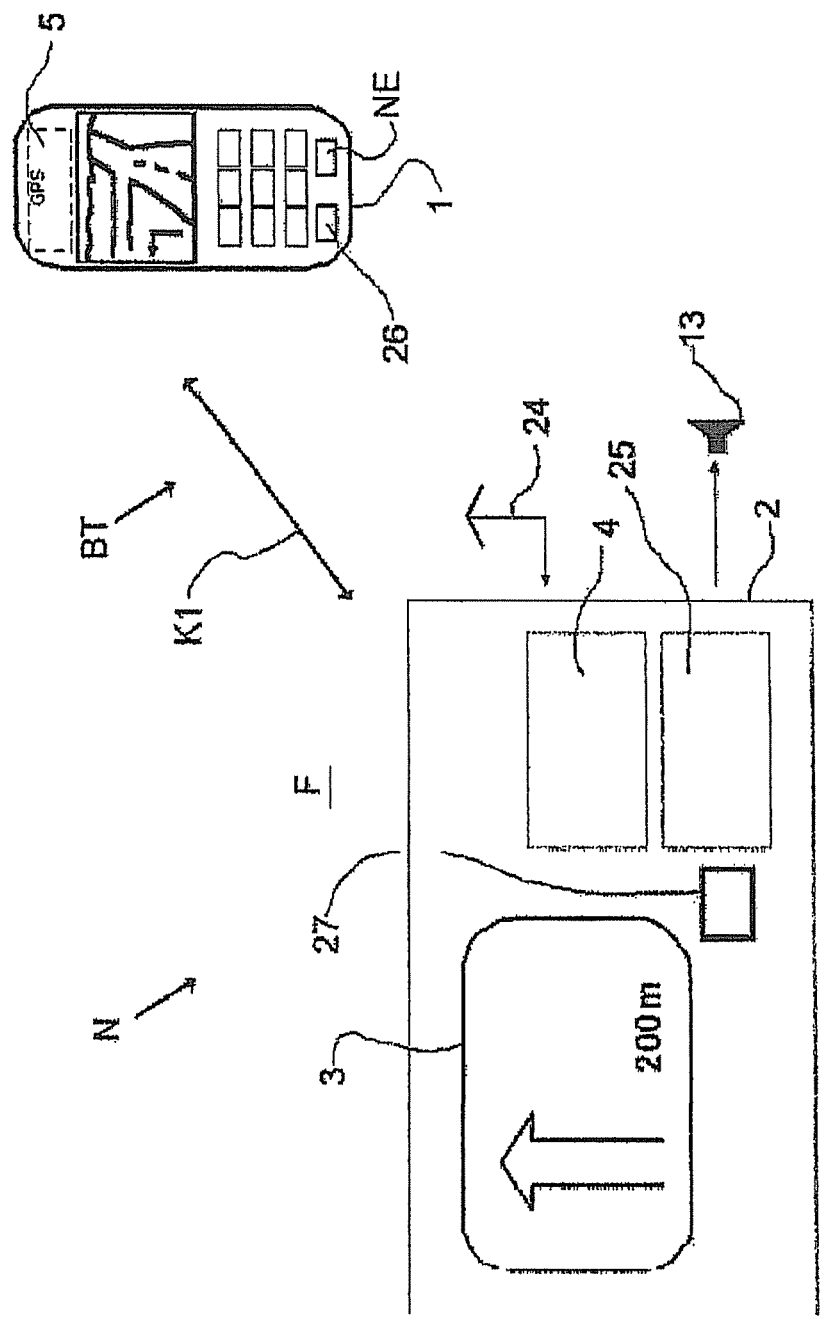
FIG. 3 shows a schematic illustration of a second navigation system according to the invention.

Finally, FIG. 3 shows a schematic illustration of a second navigation system N according to the invention. In this navigation system N, the navigation computer 1 used is a mobile telephone 6. This is connected to a central control unit 2, which is fitted in a vehicle F, via a communication link K1, which is in the form of a Bluetooth link BT. The central control unit 2 comprises a GPS receiver 4, which is fitted in the latter and which is connected to a GPS antenna. In addition to a display 3, the central control unit 2 also comprises an audio amplifier 25, in which audio signals generated in the control unit 2 by a voice generator 27 are amplified for a loudspeaker 13. The mobile telephone 6 has a further GPS receiver 5 and a navigation unit NE. Provided that the mobile telephone 6 or the navigation computer 1 has a communication link to the central control unit 2 and the GPS receiver 4 of the central control unit 2 is working, the GPS receiver 5 of the mobile telephone 6 remains switched off so as not to burden an energy store 26 in the mobile telephone 6.

Figure 4:
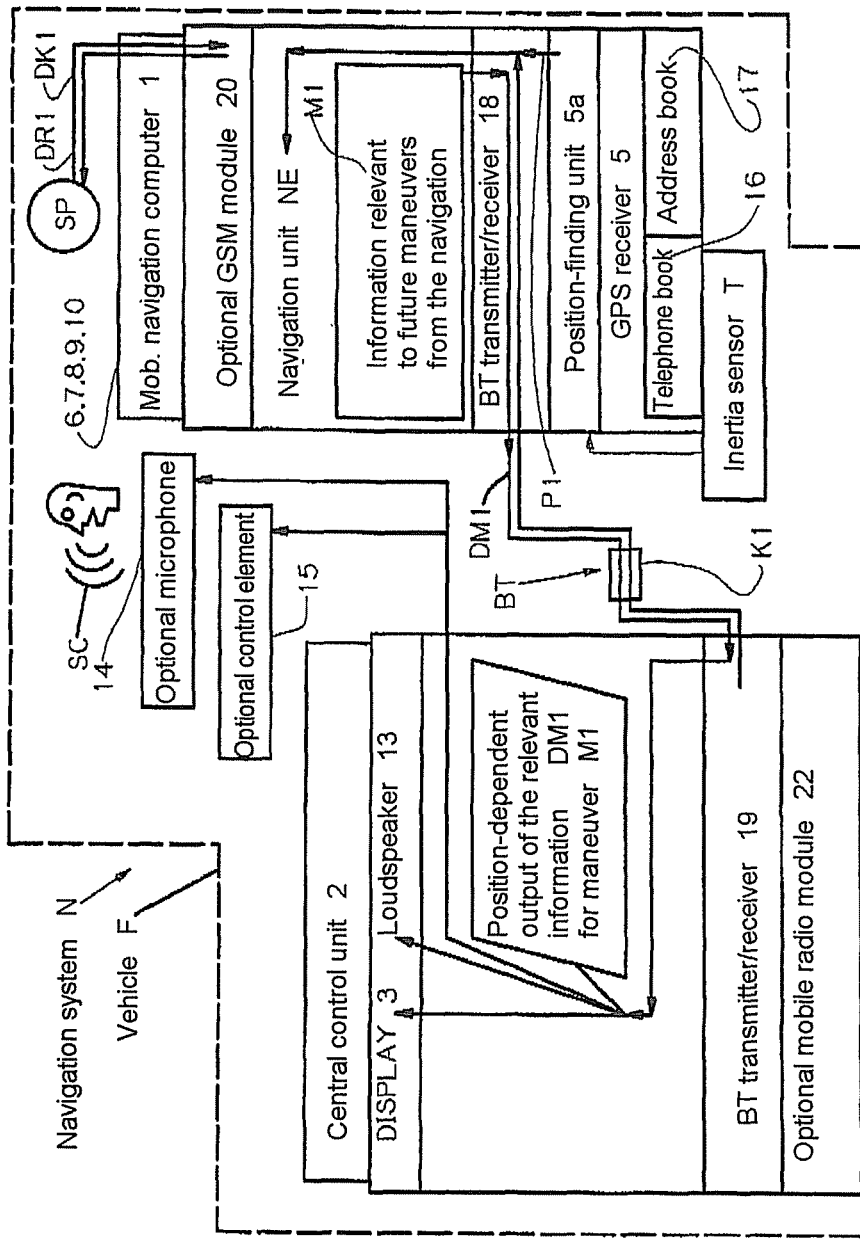
FIG. 4 shows a schematic illustration of a further navigation system according to the invention in a vehicle.

FIG. 4 schematically shows a further navigation system N according to the invention. The navigation system N is provided for a vehicle F and comprises a mobile navigation computer 1, a vehicle-based central control unit 2 and a communication link K1 between the mobile navigation computer 1 and the central control unit 2. In the course of the navigation, relevant information DM1 regarding a respective maneuver M1 which is to be performed (see also FIG. 2) can be transmitted from a navigation computer 1 to the control unit 2. This information DM1 can be output visually and/or audibly for a user of the vehicle F via the central control unit 2. In line with the invention, the mobile navigation computer 1 is in the form of a mobile telephone 6, in the form of a mobile and/or portable navigation system 7, in the form of a laptop 8, in the form of a personal digital assistant 9 or in the form of a holder shell 10 for a mobile telephone, for example. The navigation computer 1 comprises a navigation unit NE and a transmission and reception unit 18 which the navigation computer 1 can use to communicate with the central control unit 2, said control unit 2 likewise having a transmission and reception unit 19. The navigation computer 1 also comprises a GPS receiver 5 and optionally a GSM module 20, a telephone book 16 and/or an address book 17. If the GPS receiver 5 is in the form of an internal GPS receiver 5 arranged in the navigation appliance 1, what is known as mobile navigation is also possible, in which the mobile navigation computer 1 forms a standalone navigation system outside the vehicle F, which standalone navigation system can be operated in the manner of offboard navigation or onboard navigation. Provided that the navigation computer 1 is incorporated in the navigation system N according to the invention, the navigation unit NE of the navigation computer 1 uses position data P1 for navigation on the basis of map material which is stored permanently and/or temporarily in the navigation computer 1. The position data P1 are determined in the mobile navigation computer 1. For the purpose of determining the position data P1, the mobile navigation computer comprises a position-finding unit 5a which processes data from the GPS receiver 5 and optionally data from an inertia sensor T. Coordinates obtained by the position-finding unit 5a are transferred to the navigation unit NE of the navigation computer 1. The central control unit 2 comprises a display 3 and a loudspeaker 13 for the visual and audible output of information regarding the navigation route and particularly for the position-dependent output of the relevant information DM1 for the maneuver M1 which is to be performed, for example turning at a junction. The display 3 may also be formed by a display which can be used for other purposes in the vehicle F. Similarly, the loudspeaker 13 may be a loudspeaker which can be used for other purposes in the vehicle F. Optionally, provision is made for the central control unit 2 to be equipped with a mobile radio module 22 and/or a hands-free device 23. For the purpose of accepting voice commands SC and/or for the purpose of implementing a hands-free function, a microphone 14 is provided for the central control unit 2. In line with one variant embodiment, provision is also made for data for map presentation DK1 and/or data for routing DR1 to be loaded from a service center SP via a mobile radio link. This means that, in comparison with a solution in which the route calculation is performed on the navigation computer 1, the mobile navigation computer 1 requires a lower computation power and a smaller memory. Input of a navigation destination can be performed on the central control unit 2 using the microphone 14 and/or the display 3 in the form of a touchscreen and/or a control element 15, for example in the form of a multifunction rotary knob.

Figure 5:
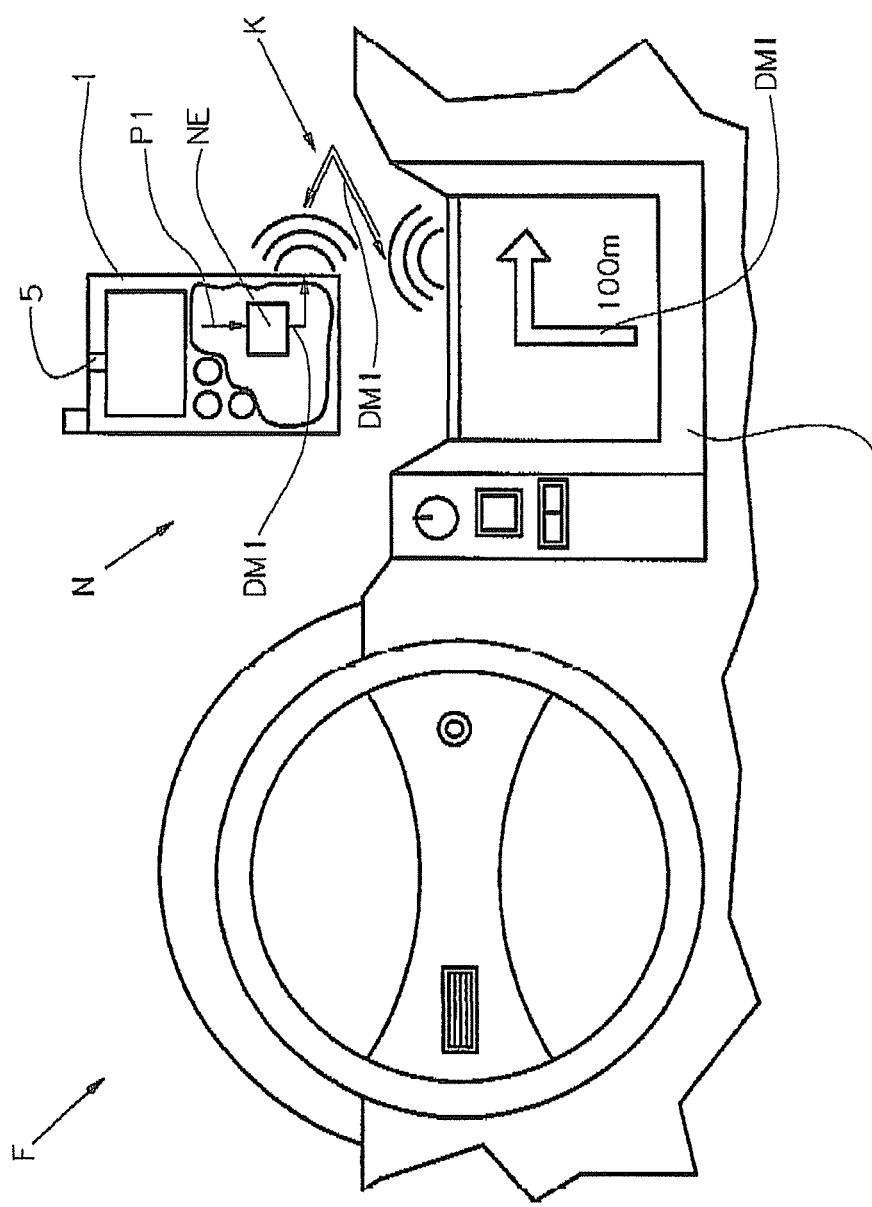
FIG. 5 shows a schematic illustration of a further navigation system according to the invention in a vehicle.

FIG. 5 schematically shows a further navigation system N according to the invention for a vehicle F. The navigation system N comprises a mobile navigation computer 1, a vehicle-based central control unit 2, a GPS receiver 5, a communication link K1 between the mobile navigation computer 1 and the central control unit 2, wherein position data P1 for the vehicle F can be processed in a navigation unit NE in the mobile navigation computer 1 to form information DM1 which is relevant to the navigation, wherein in the course of a navigation the relevant information DM1 regarding a respective maneuver which is to be performed can be transmitted from the navigation computer 1 to the control unit 2, and wherein this information DM1 can be output visually and/or audibly via the central control unit 2.

The invention is not limited to exemplary embodiments which are illustrated or described. Rather, it comprises developments of the invention within the context of the patent claims. In particular, the invention provides for the navigation system according to the invention to be complemented in line with one or more of the embodiments presented below. In accordance with a first embodiment, the invention provides for vehicle-specific data D11, D12 to be transmitted to the navigation computer 1 by the central control unit 2 and to be used in the mobile navigation computer 1 in order to improve and complement the position finding. In accordance with a second embodiment, the invention provides for the position data P1 from the central control unit 2 for the mobile navigation computer 1 and the relevant information DM1 from the mobile navigation computer 1 for the central control unit 2 to be transmitted via the same communication link K1. In accordance with a third embodiment, the invention provides for the position data P1 from the central control unit 2 for the mobile navigation computer 1 and the relevant information DM1 from the mobile navigation computer 1 for the central control unit 2 to be transmitted via different communication links K3, K4. In accordance with a fourth embodiment, the invention provides for the relevant information DM1 to be output via the central control unit 2 at times T1, which can be determined by the central control unit 2. In accordance with a fifth embodiment, the invention provides for the relevant information DM1 to be output via the central control unit 2 when waypoints WP1 which can be determined by the central control unit 2 are reached. In accordance with a sixth embodiment, the invention provides for the relevant information DM1 to be output graphically on a display 3 and/or audibly on at least one loudspeaker 13. In accordance with a seventh embodiment, the invention provides for encoded and/or compressed relevant information DM1 from the navigation computer 1 to be decoded and/or decompressed in the central control unit 2. In accordance with an eighth embodiment, the invention provides for relevant information DM1 from the navigation computer 1 which has been decoded and/or decompressed by the central control unit 2 to be combined to form at least one command B1 on the basis of time and/or position. In accordance with a ninth embodiment, the invention provides for the navigation destination A1 for the routing R1 to be input on the central control unit 2, wherein the navigation destination A1 can be transmitted to the mobile navigation computer 1 and wherein the required route calculation can be performed by the mobile navigation computer 1. In accordance with a tenth embodiment, the invention provides for the navigation destination A1 to be captured by means of the display 3 of the central control unit 2. In accordance with an eleventh embodiment, the invention provides for the central control unit 2 to be equipped with a microphone 14 which can be used to define a navigation destination A1 by means of voice commands SC. In accordance with a twelfth embodiment, the invention provides for the central control unit 2 to be equipped with at least one control element 15, the operation of which can be used to define a navigation destination A1. In accordance with a thirteenth embodiment, the invention provides for a telephone book 16 stored in the navigation computer 1 to be transmitted to the central control unit 2 and, on the basis of this, a navigation destination A1 to be selected by means of the central control unit 2, said navigation destination A1 being able to be completed particularly using an address book 17 which is present in the navigation computer 1. In accordance with a fourteenth embodiment, the invention provides for an address book 17 stored in the navigation computer 1 to be transmitted to the central control unit 2 and, on the basis of this, a navigation destination A1 to be selected using the central control unit 2. In accordance with a fifteenth embodiment, the invention provides for the input of the navigation destination A1 to be automatically followed by the navigation computer 1 checking a service center SP. In accordance with a sixteenth embodiment, the invention provides for the navigation system N to be used as a hands-free device for the mobile telephone when a mobile telephone is used as the navigation computer 1.

LIST OF REFERENCE SYMBOLS

1 Navigation computer
2 Vehicle-based central control unit
3 Display of 2
4 GPS receiver in F
5 Further GPS receiver in 1
6 Mobile telephone
7 Mobile navigation system
8 Laptop
9 PDA
10 Holder shell for a mobile telephone
11 Rotation angle sensor
12 Speed pulse transmitter
13 Loudspeaker of 2
14 Microphone of 2
15 Control element of 2
16 Telephone book from 1
17 Address book from 1
18 Transmission and reception unit of 1
19 Transmission and reception unit of 2
20 Mobile radio module and/or GSM module in 1
21 Position-finding unit in 2
22 Mobile radio module and/or GSM module in 2
23 Hands-free device in 2
24 GPS antenna
25 Audio amplifier
26 Energy store of 6
27 Voice generator
A1 Navigation destination
BT Bluetooth link
DK1 Data for map presentation from SP
DM1 Relevant information regarding M1
DR1 Data for the routing from SP
D4 Data from the GPS receiver 4
D11 Data from the rotation angle sensor 11
D12 Speed pulses from the speed pulse transmitter 12
F Vehicle
K1 Communication link between 1 and 2
K2 Second communication link
K3, K4 Further communication link
M1 Maneuver to be performed
N Navigation system
NE Navigation unit
P1 Position data from F
PE Ground-based position data from 11 and/or 12
PS Satellite-based position data from 4
R1 Routing
Sc Voice command
SP Service center
T Inertia sensor
T1 Time
WP1-WP6 Waypoint
WF Wireless fidelity link

We claim:
1. A navigation system for a vehicle comprising a mobile navigation computer, a vehicle-based central control unit, a GPS receiver, a communication link between the mobile navigation computer and the central control unit, wherein position data for the vehicle is processed in a navigation unit in the mobile navigation computer to form information relevant to the navigation, wherein in the course of the navigation the relevant information is transmitted from the navigation computer to the control unit for a respective maneuver which is to be performed, and wherein this information is output in at least one of visual and audible forms via the central control unit, wherein the position data for the vehicle is determined by the position-finding unit of the central control unit, using at least one of the GPS receiver associated with the central control unit and at least one sensor associated with the central control unit, and is transmitted to the mobile navigation computer, wherein the vehicle is navigated on the basis of the relevant data calculated for the navigation from the transmitted position data in the navigation unit of the mobile navigation computer.

2. A navigation system for a vehicle comprising a mobile navigation computer, a vehicle-based central control unit, a GPS receiver, a communication link between the mobile navigation computer and the central control unit, wherein position data for the vehicle is processed in a navigation unit in the mobile navigation computer to form information relevant to the navigation, wherein in the course of the navigation the relevant information is transmitted from the navigation computer to the control unit for a respective maneuver which is to be performed, and wherein this information is output in at least one of visual and audible forms via the central control unit, wherein the control unit receives detailed map information pertaining to a corridor which is to be traversed together with information which is relevant to the routing, and the control unit uses this detailed information for presenting a map and for outputting relevant information at defined waypoints on the basis of position calculations performed by the control unit.

3. A control unit for forming a navigation system for a vehicle, wherein the control unit receives and stores relevant information for at least one maneuver, and the relevant information is output by the control unit at defined waypoints on the basis of a position calculation performed by the control unit.

4. A navigation system for a vehicle comprising a mobile navigation computer, a vehicle-based central control unit, a GPS receiver, a communication link between the mobile navigation computer and the central control unit, wherein position data for the vehicle is processed in a navigation unit in the mobile navigation computer to form information relevant to the navigation, wherein in the course of the navigation the relevant information is transmitted from the navigation computer to the control unit for a respective maneuver which is to be performed, and wherein this information is output in at least one of visual and audible forms via the central control unit.

5. The navigation system as claimed in claim 4, wherein the position data for the vehicle is determined by a position-finding unit in the mobile navigation computer, using at least one of the GPS receiver associated with the navigation computer and at least one sensor associated with the navigation computer, and is processed in the navigation unit of the mobile navigation computer to form the data which are relevant to the navigation.

6. The navigation system as claimed in claim 4, wherein the position data for the vehicle is determined by the position-finding unit of the central control unit, using at least one of the GPS receiver associated with the central control unit and at least one sensor associated with the central control unit, and is transmitted to the mobile navigation computer, wherein the vehicle is navigated on the basis of the relevant data calculated for the navigation from the transmitted position data in the navigation unit of the mobile navigation computer.

7. The navigation system as claimed in claim 1, wherein the GPS receiver for vehicle-based navigation is arranged in the vehicle.

8. The navigation system as claimed in claim 7, wherein the GPS receiver for vehicle-based navigation arranged in the vehicle is connected to at least one of the central control unit and the mobile navigation computer by a wireless communication link.

9. The navigation system as claimed in claim 1, wherein the mobile navigation computer is used to perform mobile navigation independently of the central control unit.

10. The navigation system as claimed in claim 1, wherein the navigation computer is in the form of one of a mobile telephone, a mobile navigation system, a laptop, a PDA, and a holder shell for a mobile telephone.

11. The navigation system as claimed in claim 1, wherein the mobile navigation computer is supplied by a service center with at least one of data for routing and data for map presentation.

12. The navigation system as claimed in claim 1, wherein the position data for the vehicle is calculated by the position-finding unit of the central control unit using data from at least one of the GPS receiver and, data from a rotation angle sensor and speed pulses from a speed pulse transmitter.

13. The navigation system as claimed in claim 12, wherein the position-finding unit of the control unit processes data from at least one of the rotation angle sensor associated with the central control unit and the speed pulse transmitter associated with the central control unit to form ground-based position data, and transmits one of coordinates ascertained therefrom and distances covered in periods of time to the navigation unit of the navigation computer via a transmission and reception unit.

14. The navigation system as claimed in claim 6, wherein the position-finding unit of the control unit processes data from the GPS receiver associated with the central control unit to form satellite-based position data and transmits coordinates ascertained therefrom to a navigation unit of the navigation computer via the transmission and reception unit.

15. The navigation system as claimed in claim 1, wherein the control unit receives detailed map information pertaining to a corridor which is to be traversed together with information which is relevant to the routing, and the control unit uses this detailed information for presenting a map and for outputting relevant information at defined waypoints on the basis of position calculations performed by the control unit.

16. A control unit for forming a navigation system for a vehicle, wherein the control unit receives and stores relevant information for at least one maneuver, and the relevant information is output by the control unit at defined waypoints on the basis of one of a position calculation performed by the control unit and a position calculation performed by a mobile navigation computer.

17. The control unit as claimed in claim 16, wherein the control unit is in the form of a separate component and sends the position data to the mobile navigation computer via a wireless communication link and receives the relevant information relating to the maneuver from the mobile navigation computer via a wireless communication link.

18. The control unit as claimed in claim 16, wherein the control unit comprises a voice generator that converts portions of the relevant information into voice signals for a loudspeaker.

\* \* \* \* \*